United States Patent [19]
Wainer et al.

[11] Patent Number: 5,472,214
[45] Date of Patent: Dec. 5, 1995

[54] EASILY CENTERED GASKET FOR RAISED FLANGES

[75] Inventors: Lilian E. Wainer, Elkton, Md.; Ross K. Hutter, West Grove, Pa.

[73] Assignee: W. L. Gore & Associates, Inc., Newark, Del.

[21] Appl. No.: 196,325

[22] Filed: Feb. 15, 1994

[51] Int. Cl.⁶ .................................................. F16J 15/10
[52] U.S. Cl. .......................................... 277/11; 277/207 A
[58] Field of Search ........................... 277/9, 11, 207 A, 277/1; 285/368, 910

[56] References Cited

U.S. PATENT DOCUMENTS

| | | | |
|---|---|---|---|
| 605,891 | 6/1898 | Merworth | 277/11 |
| 695,174 | 3/1902 | Roller | 277/11 |
| 1,731,404 | 10/1929 | Wetherill | 277/11 |
| 1,942,704 | 1/1934 | Hubbard et al. | 277/11 |
| 2,442,312 | 5/1948 | Price | 277/11 |
| 2,474,790 | 6/1949 | Rossman | 277/11 |
| 3,108,818 | 10/1963 | Furstenburg | 277/189 |
| 3,480,301 | 11/1969 | Kroening | 285/119 |
| 3,573,870 | 4/1971 | Gastineau et al. | 277/11 |
| 3,620,554 | 11/1971 | Ward et al. | 277/11 X |
| 3,781,043 | 12/1973 | Hagmann | 285/363 |
| 4,002,344 | 1/1977 | Smith | 277/11 |
| 4,095,809 | 6/1978 | Smith | 277/180 |
| 4,269,417 | 5/1981 | Dutton | 277/11 |
| 4,436,310 | 3/1984 | Sawabe et al. | 277/11 |
| 4,522,536 | 6/1985 | Vidrine | 405/168 |
| 5,118,121 | 6/1992 | Hellman, Sr. | 277/209 |
| 5,141,256 | 8/1992 | Ziu | 285/13 |
| 5,203,576 | 4/1993 | Miyaoh et al. | 277/235 B |
| 5,362,115 | 11/1994 | Carr | 277/207 A X |

FOREIGN PATENT DOCUMENTS

| | | |
|---|---|---|
| 6935565 | 9/1971 | France . |
| 1061419 | 3/1967 | United Kingdom . |
| 93/25836 | 12/1993 | WIPO . |

OTHER PUBLICATIONS

Literature: "Gore Dichtungstechnik"; W. L. Gore & Associates GmbH; Oct. 1993.

Primary Examiner—William A. Cuchlinski, Jr.
Assistant Examiner—John L. Beres
Attorney, Agent, or Firm—David J. Johns

[57] ABSTRACT

The present invention is an easily mounted and centered gasket particularly suitable for use with raised flange joints and similar applications. The gasket of the present invention employs a unique design to utilize external mounting bolts to assist in holding the gasket in place during initial joint assembly and cut-out exterior edges to allow for accurate final centering of the gasket. Due to its accuracy in mounting position, the gasket of the present invention provides tighter gasket tolerances, and thus cleaner laminar flow, through fluid conduits.

15 Claims, 5 Drawing Sheets

EASILY CENTERED GASKET FOR RAISED FLANGES

BACKGROUND OF THE INVENTION

1. Field of the Invention

The present invention relates to gaskets for sealing joints, such as bolted flange joints, in fluid conduits, and particularly gaskets which can be readily centered in such joints.

2. Description of Related Art

In the past many systems and designs have been proposed to center annular gaskets on bolted flanges. Centering of these gaskets is considered necessary for at least two reasons: (1) to assure a proper seal by retaining the gasket in the proper sealing orientation during installation; and (2) to avoid disruption of the flow of fluid inside the fluid conduits after installation, which may produce many undesirable conditions, such as non-laminar flow, unwanted losses in pressure, or the possible accumulation of fluid contaminants.

Two basic geometries have emerged as the primary commercially available solutions to this problem-ring gaskets and full face gaskets. Both types of gaskets use the bolts of the flange to help locate the gasket. Unfortunately, due to excessive tolerances in the positioning of the bolts in such joints, neither of these techniques can be considered particularly accurate.

Ring gaskets are designed so that their outer diameter (OD) makes contact with all bolts when the bolts are centered in bolt holes of the flange. By properly proportioning the center hole of the gasket relative to the bolt holes, this method should approximately center the gasket in place.

Full face gaskets are designed with bolt holes of the same general size and geometric layout as the flanges. The gasket is then mounted in place with the joint mounting bolts holding the gasket into place. However, in order to ease mounting, the bolt holes in the gasket are generally larger than the bolts themselves, introducing additional inaccuracy in the mounting process. This deficiency may be counteracted in some part by the fact that the gasket extends beyond the mounting bolts to the exterior of the conduit, allowing for some fine-tuning of the centering of the gasket if care is taken to make sure the gasket is completely even with the exterior of the conduit before final mounting of the gasket occurs.

A number of further solutions have been proposed to improve the centering of gaskets. Examples of various systems using mounting bolts to help mount and/or center gaskets are shown in: U.S. Pat. No. 605,891 issued Jun. 21, 1989, to Merwarth; U.S. Pat. No. 695,174 issued Mar. 11, 1902, to Roller; U.S. Pat. No. 1,942,704 issued Jan. 9, 1934, to Hubbard et al.; U.S. Pat. No. 3,480,301 issued Nov. 25, 1969, to Kroening; U.S. Pat. No. 3,781,043 issued Dec. 25, 1973, to Hagmann; U.S. Pat. No. 4,002,344 issued Jan. 11, 1977, to Smith; U.S. Pat. No. 4,436,310 issued Mar. 13, 1984, to Sawabe et al.; and U.S. Pat. No. 4,522,536 issued Jun. 11, 1985, to Vidrine.

A drawback with any system using bolts to help center the gasket is the excess tolerance often permitted for the bolts. Thus, only partial centering is achieved by using the bolts as guides since all standard flanges have bolt holes slightly bigger than the bolts. During installation the bolts move position within the bolt holes, and thus make it virtually impossible to center each bolt on its bolt hole to assure precise centering. Gaskets manufacturers and users having recognized this occurrence have specified in new ANSI B16.5-1988 standards gaskets' inner diameters somewhat bigger than the pipe's inner diameter (ID) to prevent gasket material from intruding into the flow even when the gasket is not perfectly centered.

The dimensions specified in the ANSI B16.5-1988 standards ensure that the ID of the gaskets can be misplaced by a maximum linear displacement of 0.12 inches for full face gaskets and 150 lb. rated flanges, assuming the gasketing material does not deform. This is the amount of space a bolt can move off center within its bolt hole, plus the amount of space the gasket can move off center from the bolt. When the ID of the gasket is the same as the ID of the flange, up to 30% of the pipe opening can be blocked by the gasket material in the smallest size, and about 48% of the circumference can become a crevice.

In most industries, it generally does not matter if the ID of the gasket is bigger than the ID of the flange, creating a crevice at the juncture. However, in certain applications, such as conduits carrying some ultra-pure materials or conduits requiring high speed laminar flow, any crevices or intrusions into the flow are critical. In high purity fluid transportation, crevices or protrusions can trap bacteria or contaminants which are later released into the mainstream flow, contaminating the rest of the system in a cyclical fashion. As a result, many steps have been taken in high purity industries to reduce protrusions and intrusions within the piping system's internal surfaces even to the microscopic level. In fact, piping pore size is regularly inspected by Scanning Electroll Microscopy (SEM) in some applications to guarantee a maximum value.

Since state of the art systems today measure contaminants in the parts per billion range, extremely small crevices or protrusions can be critical to the performance of the system. In these systems a way to precisely center the gasket so that the ID of the gasket exactly meets the ID of the flange is very desirable, but up to now not available.

Another approach which has been attempted is to use external tabs to assist in aligning and retaining the gasket in a centered position. Such devices are shown in U.S. Pat. No. 1,731,404 issued Oct. 15, 1929, to Wetherill as well as U.S. Pat. No. 4,522,536. Although these centering methods may provide some assistance on a macro-scale, they do not address the concerns of how to precisely center a gasket within joints demanding exact tolerances.

A further problem that has emerged in high purity applications and the like is the growing use of raised flange gaskets employing mounting bolts spaced apart from the flange sealing surfaces. Often these joints are connected using separated backing plates or similar devices pulled toward one another using long mounting bolts. For these applications it is often quite difficult to hold and center between sealing surfaces a ring gasket having the same geometry as the sealing surfaces. This difficulty is due to restricted access due to a relatively small gap between backing plates. This problem is compounded by the lack of bolts within the sealing surface to provide loose alignment and stable positioning of the gasket prior to final centering.

At present, the best available solution to ease mounting in raised flange joints is to use a modified full face gasket that extends well beyond the sealing surfaces to join with the mounting bolts. Although this is helpful for loose mounting of the gasket between the backing plates, precise alignment is significantly handicapped since the exterior of the conduit is difficult to use as a gauge for final positioning (i.e., in this case, the edge of the gasket extends beyond the external mounting bolts, providing no surface in direct contact with the gasket to guide final alignment). Further complicating centering in certain raised flanges is the fact that some backing plates are also loosely mounted, again providing excessive tolerances to hinder accurate gasketing centering. Finally, this method of mounting tends to be unduly wasteful of gasket material, with a substantial amount of material providing no sealing or other function.

Another approach in these applications is to use a ring gasket larger than the sealing surfaces that can be rested upon lower external mounting bolts for initial gasket placement. While this approach assists in initial gasket placement, it suffers from the same deficiencies as using a full face gasket in these applications, including difficulty in judging exact final gasket placement and needless use of gasket material external to the sealing surfaces.

Accordingly, it is a primary purpose of the present invention to provide a gasket that can be accurately and easily centered within a joint.

It is another purpose of the present invention to provide a gasket that eases initial positioning and final alignment of a gasket within raised flange gasket applications.

These and other purposes of the present invention will become evident from review of the following specification.

SUMMARY OF THE INVENTION

An easily and accurately centered gasket is provided where the gasket is aligned with a raised type flange by the exterior surface of the raised part of the flange, not by the bolts of the assembly. The preferred construction of the present invention employs a gasket with a annular sealing area and one or more extensions protruding therefrom to permit loose attachment to distal mounting bolts. In this manner, initial loose mounting of the gasket can occur using the mounting bolts, with final accurate positioning of the gasket occurring by centering an outer edge of the sealing area with a conduit's exterior surface.

The gasket is cut, molded, or otherwise formed so that its sealing area's inner diameter (ID) is the same as the flange's ID and the sealing area's outer diameter (OD) is exactly the OD of the raised part of the flange. In this manner, by orienting the outer diameter of the gasket sealing area even with the exterior of the raised part of the flange, the inner diameter of the gasket should precisely match that of the conduit. As a result, an easily mounted and centered gasket is provided which is suitable for demanding sealing applications requiring highly accurate positioning of a gasket within a conduit.

DESCRIPTION OF THE DRAWINGS

The operation of the present invention should become apparent from the following description when considered in conjunction with the accompanying drawings, in which.

DETAILED DESCRIPTION OF THE INVENTION

The present invention is an improved gasket for use in a variety of sealing applications, and particularly for use in sealing raised flange joints in gas and liquid fluid conduits.

Figure 1:
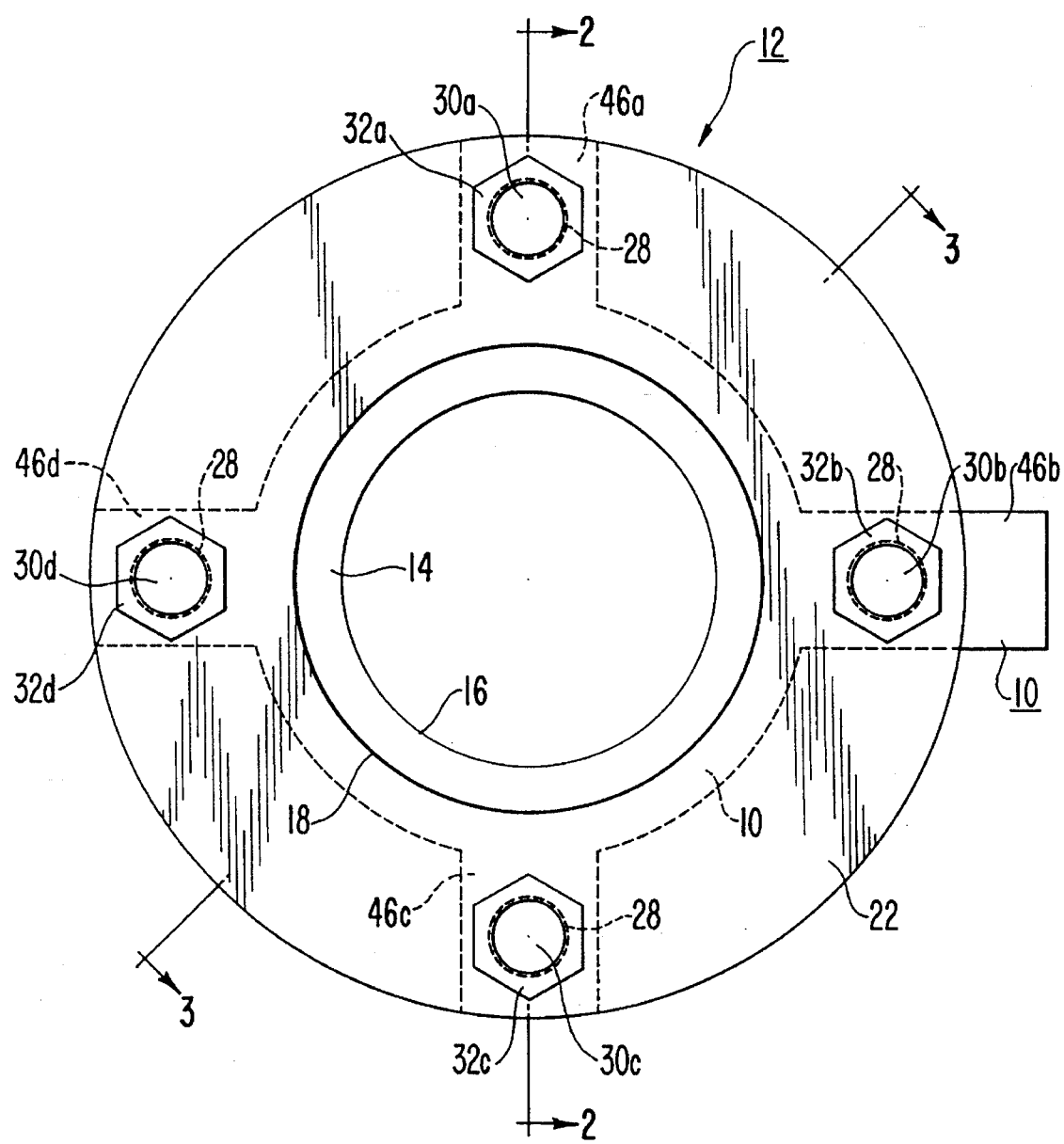
FIG. 1 is front elevational view of a raised flange fitting with a first embodiment of a gasket of the present invention mounted therein.
Figure 2:
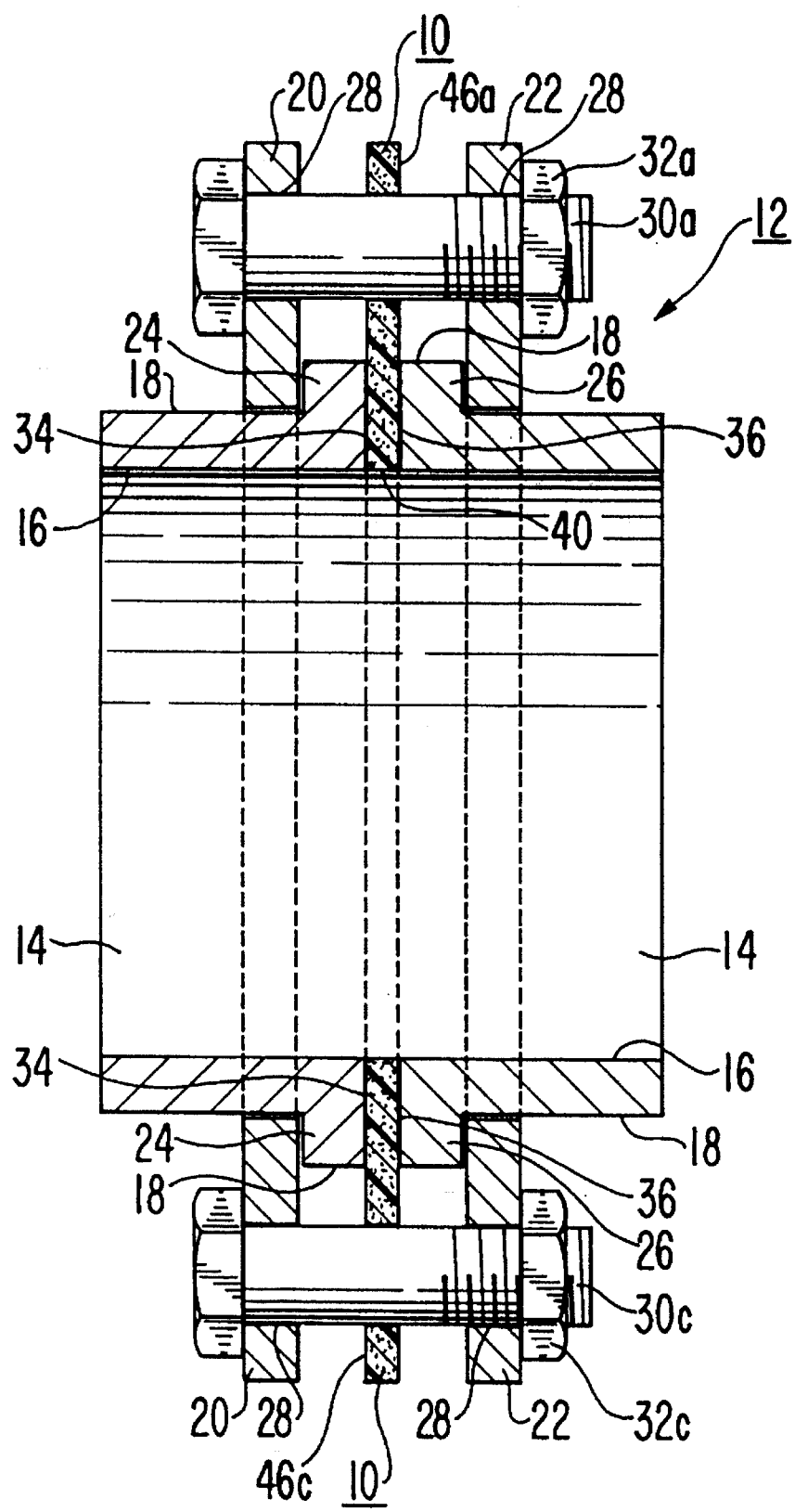
FIG. 2 is a cross-sectional view along line 2—2 of FIG. 1.
Figure 3:
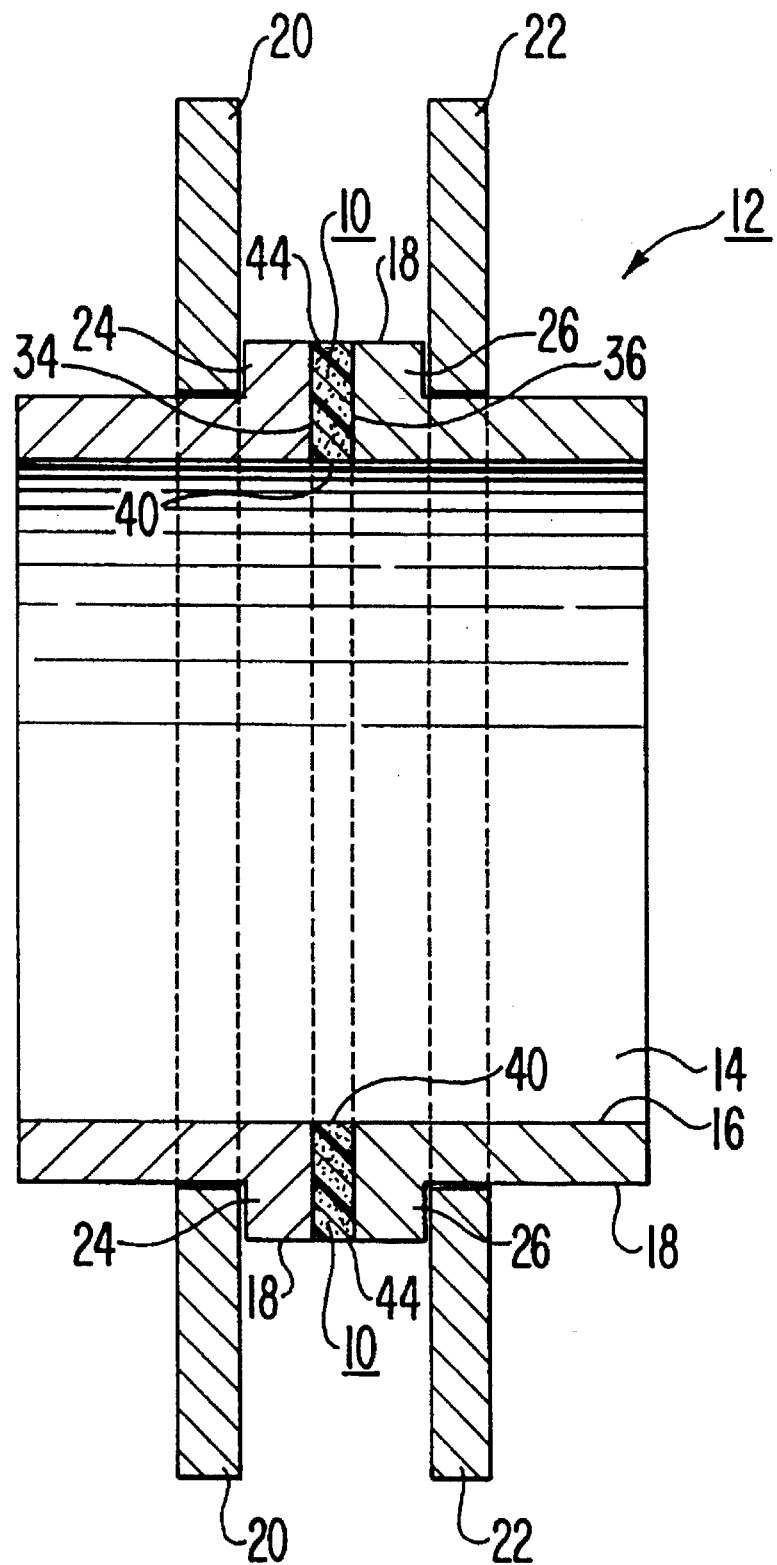
FIG. 3 is a cross-sectional view along line 3—3 of FIG. 1.

FIGS. 1 through 3 show a gasket 10 of the present invention mounted in a raised flange joint 12. The joint comprises: a fluid conduit 14, the conduit including an interior surface 16 (or inner diameter (ID)) and an exterior surface 18 (or outer diameter (OD)); two backing plates 20, 22, adapted to fit around raised flange ends 24, 26 of the fluid conduit 14, and having bolt holes 28 therein; and mounting bolts 30a 30b, 30c, 30d and mounting nuts 32a, 32b, 32c, 32d attached through the bolt holes 28 and forcing the backing plates 20, 22 toward one another. When attached together in the manner illustrated, the flange ends 24, 26 of the fluid conduit 14 provide two sealing surfaces 34, 36 which form a fluid tight seal with gasket 10.

As has been noted, a difficulty in mounting a gasket in a joint of this type is in accurately positioning the gasket between the two backing plates 20, 22. If a gasket is employed which merely seats between the sealing surfaces 34, 36, since no bolts are present to assist in rough positioning, it has proven burdensome to hold the gasket in position while assembling the joint 12. Alternatively, if either a large ring gasket or a full face gasket is used, employing the external bolts 30 to hold initial position during assembly, excessive tolerances of the bolts 30, flange bolt holes 28, the backing plates 20, 22 themselves, and/or the gasket bolt holes make it difficult to align the gasket accurately within the joint.

Figure 4:
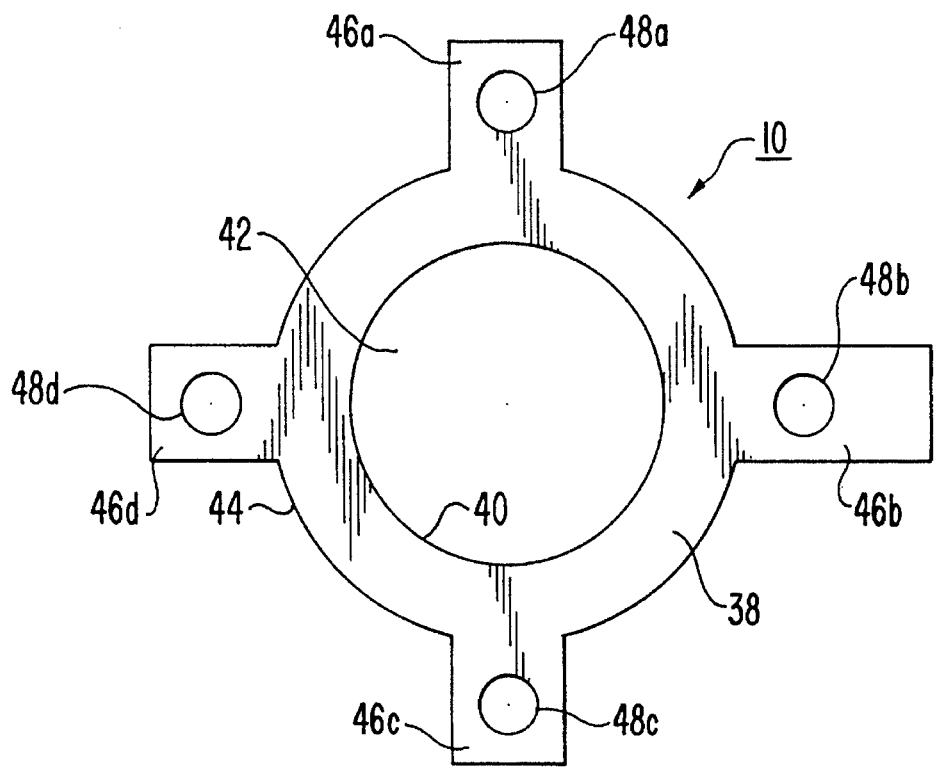
FIG. 4 is a is a plan view of the first embodiment of a gasket of the present invention.

The gasket of the present invention overcomes both of these deficiencies. As is shown in FIG. 4, the gasket 10 of the present invention includes a circular sealing area 38 having an interior edge 40 closely or precisely corresponding in dimensions with the interior surface 16 of conduit 14 and defining a center opening 42, and having an exterior edge 44 at least a segment of which closely or precisely corresponds in dimensions with the exterior surface 18 of the conduit 14 at its ends 24, 26. This gasket 10 can be readily centered into an exact position within the joint 12 by reaching between the backing plates 20, 22 and aligning the exterior edge 44 of the gasket to be even with the exterior surface 18 of the conduit 14.

To aid in initial joint assembly, the gasket 10 also includes one or more extensions 46a, 46b, 46c, 46d protruding from the sealing area 38 and adapted to attach to means for holding the joint together. In the illustrated embodiment, openings 48a, 48b, 48c, 48d are provided in each of the extensions, respectively, for attaching the gasket 10 to bolts 30a, 30b, 30c, 30d. Since the bolts 30 are only used for rough, initial orientation of the gasket, the openings 48 can be slightly larger than bolts 30 without effecting the accurate seating of the gasket.

The method of installation of the gasket of the present invention commences with a preliminary alignment provided by the openings 48. Once the gasket is tightened by hand, the gasket can be further centered by aligning its exterior edge 44 with the exterior 18 of the conduit 14. If sufficient space is present between backing plates 20, 22, this can be done manually; if space is limited between the backing plates 20, 22, this can be done with the aid of an elongated object that has a flat ending. Small corrections can be made from all sides of the gasket until the gasket is accurately centered. Once the gasket is in its correct position, the joint can then be completely sealed by torquing the bolts 30 to full sealing pressure.

Accordingly, the gasket 10 of the present invention provides the benefit of a full face gasket in initial mounting ease in a raised flange gasket application, while permitting extremely accurate gasket centering before final gasket assembly. Thus, a smooth, undisrupted flow can be readily provided through the conduit, making the gasket of the present invention particularly suitable for sensitive sealing applications. A further significant advantage of the present invention over using a full face gasket in raised flange gasket applications is that gasket material waste is limited, with minimal gasket material employed for non-sealing uses.

The gasket of the present invention may be employed with a variety of different gasket materials. Preferably the gasket is constructed from a continuous material that has been cut, stamped, molded, machined, or otherwise: shaped to the desired dimensions. Alternatively, the gasket may be constructed from two or more different materials, such as providing a sealing area 38 of one material and extensions 46 of different material. The materials may be combined into the complete gasket 10 through any appropriate method, such as with use of adhesive, bonding, etc.

It should be appreciated that for applications very sensitive to gasket interference with the fluid flow, the material should deform minimally or predictably under load so as to avoid material expansion or creep into the conduit 14. Possibly suitable materials for use with the present invention include: polytetrafluoroethylene (PTFE), expanded PTFE, PTFE or expanded PTFE with fillers, rubbers or other elastomers, non-asbestos sheet materials, graphite sheets, composite sheets, etc.

The present invention may be constructed in a variety of shapes and sizes for use in different applications. For example, many different permutations of the extensions 46 may be provided depending upon need, with changes readily made in their number, shape, and/or sizes. Examples of other possible embodiments of the present invention are shown in FIGS. 5 through 7.

Figure 5:
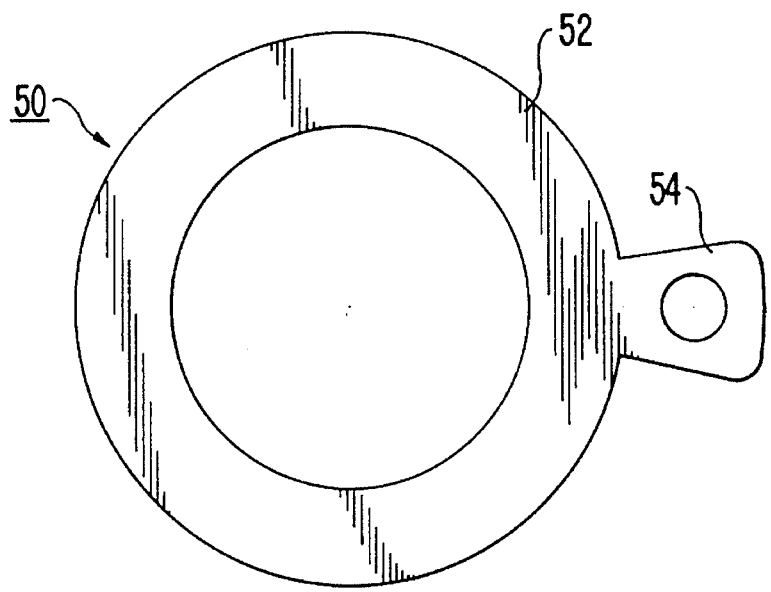
FIG. 5 is a plan view of a second embodiment of a gasket of the present invention.

In the embodiment shown in FIG. 5, a gasket 50 is shown having a sealing area 52 and a single extension 54. When used with the extension 54 mounted to a centered upper mounting bolt, this embodiment contributes a basic initial assistance in rough centering of the gasket while providing minimal wasted gasket material.

Figure 6:
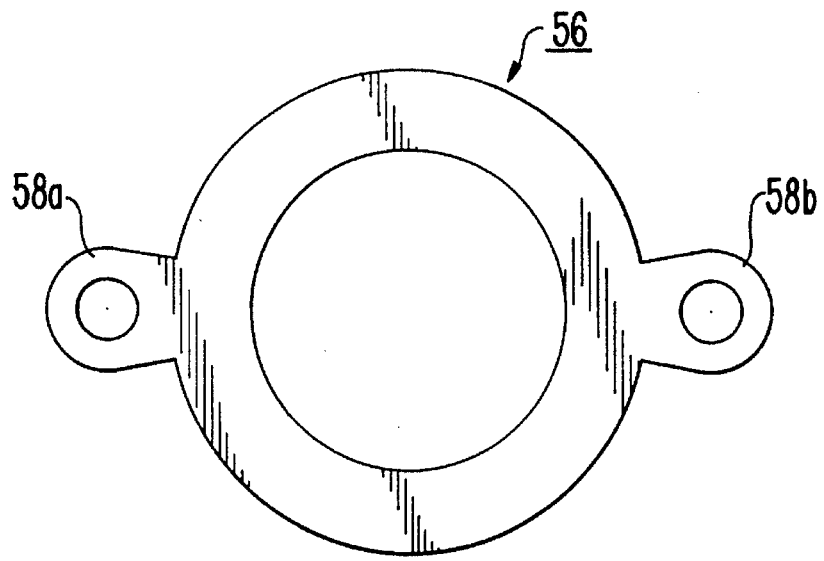
FIG. 6 is a plan view of a third embodiment of a gasket of the present invention.

FIG. 6 shows a gasket 56 utilizing two extensions 58a, 58b. This embodiment is believed to provide a better initial support than a single extension during joint assembly without regard to bolt placement. Again, minimal gasket material is wasted in this design. The rounded shape of the extensions in this embodiment has also been designed to minimize wasted material.

Figure 7:
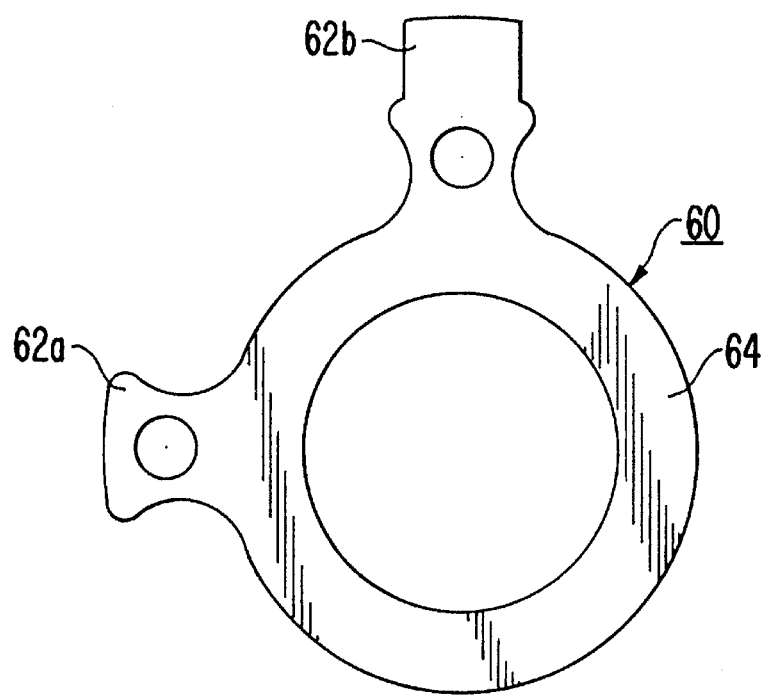
FIG. 7 is a plan view of a fourth embodiment of a gasket of the present invention.

FIG. 7 shows a gasket 60 employing another embodiment of two extensions 62a, 62b. This embodiment may be used in instances where initial support of multiple extensions is desired but access to all the bolts may be restricted. Furthermore, in this instance there are stronger and wider connections between gasket sealing area 64 and the extensions 62 to avoid possible breakage during handling and installation. Additionally, the extensions 62a, 62b follow the same general dimensions and geometry of the backing plates 20, 22 to avoid possible interference with other equipment, conduits, or tools mounted or used in close proximity.

In each of the embodiments of FIGS. 4 and 7, one extension (46b, 62b, respectively) is included with which is slightly longer than the rest. This is a handy means to label the gasket material with manufacturer identification or other marking.

It should be appreciated that although the present invention is shown mounted on a flange joint having four bolts, the present invention can be used with virtually any flange joint or similar joint construction. As such, the use of the term "flange joint" herein is intended to encompass any fluid connection having a gasketed sealing area held together by bolts, clamps, or other means external to the sealing area. Examples of other constructions include those having two, three, six, eight or more bolts. Additionally, it should be understood that the number of extensions employed is dependent on the amount of support desired and the flexibility of use of the gaskets, not necessarily the number of total bolts used to seal any particular joint.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A gasket in a flange joint in a fluid conduit, the conduit at the joint including an inner diameter through which fluid flows, an outer diameter defining an exterior of the conduit, and a sealing area between the inner diameter and the outer diameter, the joint being held together by means external to the sealing area and sufficiently spaced from the joint so as to permit access to the exterior of the joint, which comprises:

the sealing area having an interior edge and an exterior edge, wherein the interior edge defines a center opening corresponding accurately in dimensions to the inner diameter of the conduit and means to center the gasket using the exterior edge of the sealing area and the outer diameter of the conduit, said means comprising at least a segment of the exterior edge corresponding accurately in dimensions to the outer diameter of the conduit;

wherein the gasket is centered in the joint so as to provide undisrupted flow through the fluid conduit by aligning the corresponding segment of the exterior edge with the outer diameter of the conduit.

2. The gasket of claim 1 wherein the means to hold the joint together comprises at least one bolt; and the gasket includes at least one extension protruding beyond the exterior edge of the sealing area including an opening therein through which the bolt may be mounted.

3. The gasket of claim 2 wherein the sealing area and the extension comprise a continuous material.

4. The gasket of claim 1 wherein the means to hold the joint together comprises backing rings mounted on either side of the joint, spaced apart from one another, and multiple bolts attached between the backing plates; and the gasket includes multiple extensions protruding beyond the exterior edge of the sealing area, each extension including an opening therein through which one of the bolts may be mounted.

5. The gasket of claim 4 wherein the sealing area and the extensions comprise continuous material.

6. The gasket of claim 1 that further comprises:

at least one extension protruding beyond the exterior edge of the sealing area adapted to be attached to the joint in order to assist in retaining the gasket in position during initial joint assembly.

7. The gasket of claim 6 wherein the gasket comprises an essentially annular center sealing area and four essentially rectangular extensions protruding therefrom, each extension including at least one mounting hole therein.

8. A gasket in a joint in a fluid conduit having an inner surface and an outer surface, which comprises:

a sealing area adapted to seat accurately between the inner surface and outer surface of the fluid conduit, the sealing area including an exterior edge;

at least one extension protruding beyond the sealing area, the extension including an opening therein through which an external mounting bolt may be attached;

means to center the gasket using the exterior edge of the sealing area and the outer diameter of the conduit, said means comprising at least a portion of the exterior edge of the sealing area conforming in dimensions to the outer surface of the fluid conduit, and wherein the gasket is readily centered within the joint by positioning an exterior edge of the sealing area even with the outer surface of the fluid conduit.

9. The gasket of claim 8 wherein the sealing area and the extension comprise a continuous material.

10. The gasket of claim 8 which includes multiple extensions protruding beyond the sealing area, each extension including an opening therein through which a mounting bolt may be mounted.

11. The gasket of claim 10 wherein the sealing area and the extensions comprise a continuous material.

12. The gasket of claim 8 wherein the gasket comprises an annular center sealing area and at least two extensions protruding therefrom, each extension including at least one mounting hole therein.

13. A method for centering a gasket within a flange joint between two segments of a conduit, the conduit comprising an inner surface and an outer surface, and the joint being held together by at least one bolt external to the conduit and sufficiently spaced from the joint so as to permit access to the exterior surface of the conduit, which comprises:

providing a gasket having a continuous sealing surface, the sealing surface being an accurate fit between the inner surface and the outer surface of the conduit;

providing at least one extension protruding beyond the sealing surface of the gasket, the extension including an opening therein adapted to attach to the bolt holding the joint together;

mounting the gasket loosely within the joint;

attaching the opening in the extension to the bolt;

centering the gasket accurately within the joint by positioning an exterior edge of the sealing area even with the outer surface of the conduit; and tightening the joint together so as to retain the gasket in its centered position.

14. The method of claim 13 which further comprises:

providing multiple extensions on the gasket, each including an opening therein adapted to attach to one of multiple mounting bolts on the joint; and attaching the gasket loosely within the joint by attaching each of the extensions to a corresponding mounting bolt.

15. The method of claim 14 which further comprises:

forming the sealing area and extensions of the gasket from a continous material.

* * * * *